United States Patent
Das et al.

(10) Patent No.: US 9,501,874 B2
(45) Date of Patent: Nov. 22, 2016

(54) EXTENDABLE CONDITION-BASED MAINTENANCE

(71) Applicant: Lockheed Martin Corporation, Bethesda, MD (US)

(72) Inventors: Sreerupa Das, Oviedo, FL (US); Joshua P. Foster, Orlando, FL (US); Ryan A. Mortimer, Orlando, FL (US)

(73) Assignee: Lockheed Martin Corporation, Bethesda, MD (US)

( * ) Notice: Subject to any disclaimer, the term of this patent is extended or adjusted under 35 U.S.C. 154(b) by 0 days.

(21) Appl. No.: 14/689,264

(22) Filed: Apr. 17, 2015

(65) Prior Publication Data

US 2015/0302666 A1    Oct. 22, 2015

Related U.S. Application Data

(60) Provisional application No. 61/980,941, filed on Apr. 17, 2014.

(51) Int. Cl.
| | |
|---|---|
| *G07C 5/00* | (2006.01) |
| *G05B 23/00* | (2006.01) |
| *G07C 5/08* | (2006.01) |
| *G05B 23/02* | (2006.01) |

(52) U.S. Cl.
CPC ........... *G07C 5/006* (2013.01); *G05B 23/0213* (2013.01); *G07C 5/0808* (2013.01)

(58) Field of Classification Search
CPC combination set(s) only.
See application file for complete search history.

(56) References Cited

U.S. PATENT DOCUMENTS

| | | | |
|---|---|---|---|
| 6,859,831 B1* | 2/2005 | Gelvin | B60R 25/1004 340/539.19 |
| 7,581,434 B1* | 9/2009 | Discenzo | G01N 33/2888 73/53.01 |

(Continued)

FOREIGN PATENT DOCUMENTS

| | | |
|---|---|---|
| EP | 1935576 A1 | 6/2008 |
| GB | 2514980 A | 12/2014 |
| WO | 2013155161 A1 | 10/2013 |

OTHER PUBLICATIONS

Author Unknown, "Condition Based Maintenance Plus (CBM+) for Material Maintenance," Department of Defense Instruction, No. 4151.22, Dec. 2, 2007, 11 pages.

(Continued)

*Primary Examiner* — Yonel Beaulieu
(74) *Attorney, Agent, or Firm* — Withrow & Terranova, PLLC

(57) ABSTRACT

A flexible condition-based maintenance (CBM) device is disclosed. A CBM device receives a plurality of sensor signals generated by corresponding sensors. The sensor signals indicate real-time conditions of components. The sensor signals are processed to generate sensor data that quantifies the real-time conditions of the components. The CBM device loads a CBM module that implements a plurality of externally invokable functions. The CBM device receives an analytics script. The first analytics script comprises a plurality of interpretable commands, and some of the plurality of interpretable commands are configured to invoke some of the plurality of externally invokable functions. The CBM module invokes a command interpreter module to interpret at least one interpretable command and generate command executable bytecodes. The command executable bytecodes are executed to generate a notification identifying a real-time condition of a component for presentation on a display device.

19 Claims, 7 Drawing Sheets

(56) References Cited

U.S. PATENT DOCUMENTS

| | | | |
|---|---|---|---|
| 2005/0049988 | A1 | 3/2005 | Dahlquist et al. |
| 2005/0273218 | A1* | 12/2005 | Breed .................... B60C 11/24 |
| | | | 701/2 |
| 2006/0167659 | A1* | 7/2006 | Miyasaka ............... B61F 15/20 |
| | | | 702/185 |
| 2006/0224533 | A1 | 10/2006 | Thaler |
| 2007/0118333 | A1* | 5/2007 | Miyasaka ............... B61F 15/20 |
| | | | 702/183 |
| 2008/0221721 | A1 | 9/2008 | Reed et al. |
| 2011/0071725 | A1 | 3/2011 | Kleve et al. |
| 2012/0078460 | A1* | 3/2012 | Mortensen .......... F02D 41/1495 |
| | | | 701/29.5 |
| 2013/0069792 | A1 | 3/2013 | Blevins et al. |
| 2013/0268241 | A1 | 10/2013 | Das et al. |

OTHER PUBLICATIONS

Author Unknown, "Condition Based Maintenance Plus (CBM+) Roadmap," Deputy Chief of Staff, G-4, Headquarters, Department of the Army, Logistics Innovation Agency, Dec. 13, 2007, 88 pages.

Bechtel, Jim, "Architectural Design Challenges for Ground Vehicle CBM+ System of Systems," Presented at Purdue: Systems Integrity for Defense Summit, Mar. 30-31, 2009, West Lafayette, Indiana, TARDEC, 11 pages.

Bergemann, Tobias, "Bytecode," Wikipedia, the free encyclopedia, retrieved from https://en.wikipedia.org/w/index.php?title=Bytecode&oldid=598575789, last edited Mar. 7, 2014, Wikipedia Foundation, 3 pages.

Brown, Edward R., et al., "Prognostics and Health Management: A Data-Driven Approach to Supporting the F-35 Lightning II," Presented at IEEE Aerospace Conference, Mar. 3-10, 2007, Big Sky, Montana, 12 pages.

Collobert, Ronan, et al., "Implementing Neural Networks Efficiently." In Montavon, G., et al., eds. Neural Networks: Tricks of the Trade, 2nd ed. Lecture Notes in Computer Science, vol. 7700, 2012, Springer-Verlag Berlin Heidelberg, pp. 537-557.

Das, Sreerupa, "An Efficient Way to Enable Prognostics in an Onboard System," IEEE Aerospace Conference, Mar. 7-14, 2015, Big Sky, Montana, IEEE, pp. 1-7.

Das, Sreerupa, et al., "Essential Steps in Prognostic Health Management," Presented at IEEE International Conference on Prognostics and Health Management, Jun. 20-23, 2011, Montreal, Quebec, Canada, 9 pages.

Gorsich, David, et al., "Ground Vehicle Condition Based Maintenance," Presented at NATO AVT172 CBM Workshop, Bucharest, Romania, Oct. 4-8, 2010, TACOM/TARDEC, 39 pages.

Grantner, Janos, et al., "Condition Based Maintenance for Light Trucks," Presented at IEEE International Conference on Systems, Man, and Cybernetics, Oct. 10-13, 2010, Istanbul, Turkey, 9 pages.

McCollom, Neal N., et al., "PHM on the F-35 Fighter," Presented at IEEE Conference on Prognostics and Health Management, Jun. 20-23, 2011, Montreal, Quebec, Canada, 10 pages.

Rabeno, Eric, et al., "Condition Based Maintenance of Military Ground Vehicles," Presented at IEEE Aerospace Conference, Mar. 7-14, 2009, Big Sky, Montana, 6 pages.

International Search Report and Written Opinion for PCT/US2013/035935 mailed Aug. 5, 2013, 9 pages.

International Preliminary Report on Patentability for PCT/US2013/035935, mailed Oct. 23, 2014, 6 pages.

International Search Report and Written Opinion for International Patent Application No. PCT/US2015/026331, mailed Jul. 6, 2015, 14 pages.

International Search Report and Written Opinion for International Patent Application No. PCT/US2015/026370, mailed Jul. 6, 2015, 13 pages.

Further Examination Report for New Zealand Patent Application No. 700767, mailed Apr. 8, 2016, 3 pages.

Patent Examination Report No. 1 for Australian Patent Application No. 2013245998, issued Jan. 27, 2016, 3 pages.

First Examination Report for New Zealand Patent Application No. 700767, mailed Nov. 26, 2015, 4 pages.

Non-Final Office Action for U.S. Appl. No. 13/860,051, mailed Apr. 4, 2016, 6 pages.

Notice of Acceptance for Australian Patent Application No. 2013245998, mailed Jul. 14, 2016, 2 pages.

Further Examination Report for New Zealand Patent Application No. 700767, mailed Aug. 8, 2016, 2 pages.

International Preliminary Report on Patentability for International Patent Application No. PCT/US2015/026331, issued Oct. 18, 2016, mailing Oct. 27, 2016, 10 pages.

International Preliminary Report on Patentability for International Patent Application No. PCT/US2015/026370, issued Oct. 18, 2016, mailing Oct. 27, 2016, 9 pages.

\* cited by examiner

EXTENDABLE CONDITION-BASED MAINTENANCE

RELATED APPLICATIONS

This application claims the benefit of provisional patent application Ser. No. 61/980,941, filed Apr. 17, 2014, entitled "EFFICIENT ARCHITECTURE FOR CONDITION-BASED MAINTENANCE," the disclosure of which is hereby incorporated herein by reference in its entirety.

GOVERNMENT RIGHTS

This invention was made with government funds under contract number W56HZV-11-C-0002 awarded by Army-GCV. The U.S. Government may have rights in this invention.

TECHNICAL FIELD

The embodiments relate generally to condition-based maintenance (CBM) of a machine, and in particular to a CBM device that facilitates the flexible extension of CBM processing analytics without a need to alter the CBM device.

BACKGROUND

Determining the real-time condition of complex machines such as ground vehicles or aircraft may be desirable for purposes of keeping an operator of such a machine apprised of problems, and to ensure maintenance is properly undertaken, preferably prior to the point at which a component fails. There is increased interest in condition-based maintenance (CBM) systems that collect sensor information in real-time from strategically placed sensors located on the machine, and continually execute analytics on the collected sensor information during operation of the machine to ensure the components are operating within desired parameters. If it is determined that a component is operating outside of desired parameters, the CBM system can generate and display an alert to the operator.

Typically, the CBM system is a combination of hardware components and interrelated complex software components. Altering any aspects of the CBM analytics, such as altering the criteria used to determine whether an alert should be presented to an operator of a vehicle, requires modification of the CBM software, recompilation and debugging of the CBM software, downloading the CBM software to the machine, and re-booting the machine to implement the new CBM software. Modifying the CBM software requires a relatively skilled software technician who is both knowledgeable in the particular computer language in which the CBM software is written, as well as the particular CBM software being modified, so that the modification does not result in unexpected problems. Such skilled technicians may be rare, resulting in desired modifications of the CBM analytics of a CBM system being delayed. Often, the user of the CBM system may have no capability of modifying the CBM system and, thus, must wait for the manufacturer of the CBM system to schedule the modification.

After the modification has been successfully implemented and tested, rolling out the modification to fleets of vehicles may be very time-consuming, and disruptive, such that each CBM system must be shut down, loaded with new CBM software, and then re-booted. This may be impractical in certain environments, such as a war zone.

SUMMARY

The embodiments include a condition-based maintenance (CBM) device that separates CBM analytics from a CBM module that executes the CBM analytics, such that CBM analytics can be relatively easily and quickly modified as desired and implemented by the CBM device without the need to load a new CBM module, or, in some embodiments, without the need to even reboot the CBM module. The CBM device also implements an extendable CBM architecture, wherein the CBM analytics can be developed using an English-based interpretable language, and can utilize custom-written externally invokable functions of the CBM module. Among other advantages, the embodiments allow relatively unskilled personnel to easily and intuitively modify the CBM analytics, and implement the modified CBM analytics without the need for a skilled software engineer, and without the need to modify a complex CBM module.

In one embodiment, a method for implementing CBM on a machine having a plurality of components is provided. A CBM device comprising a processor receives a plurality of sensor signals generated by a plurality of corresponding sensors. The plurality of sensor signals indicates real-time conditions of corresponding components of the plurality of components. The plurality of sensor signals are processed to generate sensor data that quantifies the real-time conditions of the corresponding components. The CBM device loads a CBM module generated at a first time and implementing a plurality of externally invokable functions. The CBM device receives a first analytics script generated at a second time. The first analytics script comprises a plurality of first interpretable commands, and some of the plurality of first interpretable commands are configured to invoke some of the plurality of externally invokable functions. The CBM module invokes a command interpreter module to interpret at least one first interpretable command and generate first command executable bytecodes. The first command executable bytecodes are executed to generate a notification identifying a real-time condition of a first component for presentation on a display device.

In one embodiment, the CBM module detects the at least one first interpretable command in the first analytics script and passes the at least one first interpretable command to the command interpreter module. The command interpreter module generates, based on the at least one first interpretable command, the command executable bytecodes that invoke the first externally invokable function. The first command executable bytecodes invoke the first externally invokable function to access the sensor data that quantifies the real-time condition of the first component and to generate the notification identifying the real-time condition of the first component for presentation on the display device.

In one embodiment, processing the sensor signals to generate the sensor data that quantifies the real-time conditions of the corresponding components includes filtering the sensor signals and extracting features from the sensor signals to generate the sensor data.

In one embodiment, the CBM module is written in a first programming language having a first syntax, and the plurality of first interpretable commands is written in a second interpretable programming language having a second syntax that is different from the first syntax.

In one embodiment, the plurality of first interpretable commands comprises English language words.

In one embodiment, the first command executable bytecodes determine, based on the sensor data, that a characteristic of the first component is outside of a first predetermined range. The first command executable bytecodes generate an alert for presentation on the display device that indicates that the characteristic of the first component is outside of the first predetermined range.

In one embodiment, a second analytics script generated at a third time that is later than the second time is generated that replaces the first analytics script. The second analytics script comprises a plurality of second interpretable commands. The CBM module invokes the command interpreter module to interpret at least one second interpretable command and generate second command executable bytecodes. The second command executable bytecodes are executed. The second command executable bytecodes determine, based on the sensor data, that the characteristic of the first component is outside of a second predetermined range that is different from the first predetermined range, and generate an alert for presentation on the display device that indicates that the characteristic of the second component is outside of the first predetermined range.

In one embodiment, the characteristic of the first component comprises one of an engine oil temperature and an engine coolant temperature.

In one embodiment, the CBM module processes the first analytics script, and assigns, based on the first analytics script, each sensor of the plurality of sensors a corresponding port value. The plurality of first interpretable commands is configured to access the sensor data associated with a corresponding sensor based on the corresponding port value.

In one embodiment, a CBM device for implementing CBM on a machine having a plurality of components is provided. The CBM device includes a sensor interface that is configured to be coupled to a plurality of sensors. The CBM device also includes a communication interface that is configured to communicate with a remote device. The CBM device includes a controller comprising a processor coupled to the sensor interface and the communication interface. The controller is configured to receive sensor signals generated by corresponding sensors of the sensors. The sensor signals indicate real-time conditions of corresponding components of the plurality of components. The controller is configured to process the plurality of sensor signals to generate sensor data that quantifies the real-time conditions of the corresponding components. The controller is further configured to load a CBM module generated at a first time and implementing a plurality of externally invokable functions. The controller is further configured to receive a first analytics script generated at a second time. The first analytics script comprises a plurality of first interpretable commands, some of the plurality of first interpretable commands configured to invoke some of the plurality of externally invokable functions. The controller is configured to invoke, via the CBM module, a command interpreter module to interpret at least one first interpretable command and generate first command executable bytecodes. The controller is further configured to execute the first command executable bytecodes to generate a notification identifying a real-time condition of a first component for presentation on a display device.

In another embodiment, a method for implementing CBM on a machine is provided. A CBM device receives a plurality of sensor signals from a plurality of corresponding sensors, the plurality of sensor signals being indicative of real-time conditions of corresponding components. A CBM module implementing a plurality of externally invokable functions accesses a first analytics script generated at a point in time. The first analytics script comprises a plurality of first interpretable commands, some of the plurality of first interpre-
table commands invoking some of the plurality of externally invokable functions. In response to a first real-time condition of a respective corresponding component, the CBM module causes execution of a respective first interpretable command to generate an alert for presentation on a display device that indicates that a characteristic of the respective corresponding component is outside of a first predetermined range.

Those skilled in the art will appreciate the scope of the disclosure and realize additional aspects thereof after reading the following detailed description of the embodiments in association with the accompanying drawing figures.

BRIEF DESCRIPTION OF THE DRAWINGS

The accompanying drawing figures incorporated in and forming a part of this specification illustrate several aspects of the disclosure, and together with the description serve to explain the principles of the disclosure.

DETAILED DESCRIPTION

The embodiments set forth below represent the information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

Any flowcharts discussed herein are necessarily discussed in some sequence for purposes of illustration, but unless otherwise explicitly indicated, the embodiments are not limited to any particular sequence of steps. The use herein of ordinals in conjunction with an element is solely for distinguishing what might otherwise be similar or identical labels, such as "first analytics script" and "second analytics script," and does not imply a priority, a type, an importance, or other attribute, unless otherwise stated herein.

The embodiments include a condition-based maintenance (CBM) device that separates CBM analytics from the CBM module that executes the CBM analytics, such that CBM analytics can be relatively easily and quickly modified as desired and implemented by the CBM device without the need to load a new CBM module, or, in some embodiments, without the need to even reboot the CBM module. The CBM device also implements an extendable CBM architecture, wherein the CBM analytics can be developed using an English-based interpretable language, and can utilize custom-written externally invokable functions of the CBM module. The embodiments allow relatively unskilled personnel to easily and intuitively modify the CBM analytics, and implement the modified CBM analytics without the need for a skilled software engineer, and without the need to modify a complex CBM module.

Figure 1:
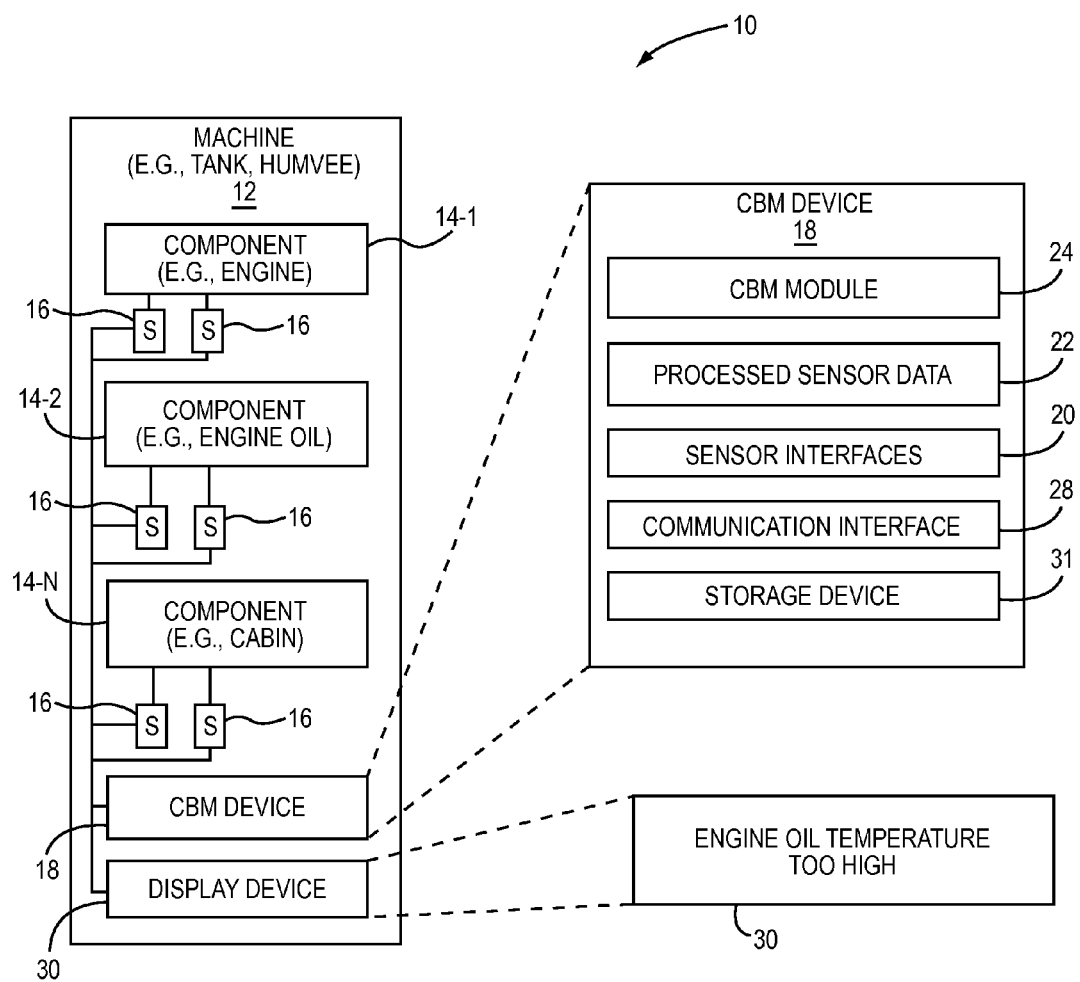
FIG. 1 is a block diagram of an environment in which embodiments may be practiced.

FIG. 1 is a block diagram of an environment 10 in which embodiments may be practiced. The environment 10 includes a machine 12 that includes a plurality of components 14-1-14-N (generally, components 14). The machine 12 can comprise any type of mobile or non-mobile device, such as, by way of non-limiting example, aircraft such as airplanes and helicopters and the like, ground vehicles such as cars, trucks, tanks, and the like, power turbines, windmills, or any other machine that includes a plurality of components that have characteristics which may be sensed and quantified.

The components 14 may comprise any item that has characteristics that may be sensed and quantified, such as, by way of non-limiting example, and in the context of a ground vehicle such as a Humvee, a transmission, an engine, a battery, hydraulic fluid, engine oil, transmission oil, a cabin, a fuel pump, an alternator, an air cleaner, and the like. The components 14 are continually or intermittently sensed by corresponding sensors 16. The sensors 16 may comprise any suitable sensor that is capable of sensing a desired real-time condition of the corresponding component 14 and generating a sensor signal that indicates such real-time condition of the corresponding component 14, such as vibrations, temperature, pressure, fluid level, voltage output, current output, moisture, and the like. A CBM device 18 includes one or more sensor interfaces 20 that are communicatively coupled to the sensors 16, and which receive the sensor signals generated by the sensors 16.

The CBM device 18, in one embodiment, comprises a printed circuit board that includes a plurality of integrated circuits and other electronics, and comprises one or more software modules, as discussed in greater detail herein, to provide certain CBM functionality. In other embodiments, the CBM device 18 comprises a computer, such as a laptop computer.

The CBM device 18 receives the sensor signals and processes the sensor signals to generate sensor data 22 that quantifies the real-time conditions of the components 14. Such processing may involve any desired or necessary computations or signal processing techniques, including filtering, analog-to-digital conversion, feature extraction, such as the use of fast Fourier transforms to convert signals from a time domain to a frequency domain, and the like.

The CBM device 18 also includes a CBM module 24 which relatively continuously processes CBM analytics, as will described in greater detail herein, based on and in response to the sensor data 22. Such CBM analytics include determining if the real-time conditions, sometimes over a period of time, of the components 14 are within predetermined parameters or ranges and, if not, generating and presenting alerts on a display device 30 or other output device for presentation to an operator of the machine 12. In one embodiment, the CBM module 24 may be initiated, or otherwise loaded, from a CBM module instruction file (not illustrated) that comprises executable software instructions. The CBM module instruction file may be downloaded or otherwise installed on the CBM device 18, and the CBM device 18 may be booted, or restarted, to initiate the CBM module 24 from the CBM module instruction file. In some embodiments, the CBM module instruction file may be written in a complex computer programming language, such as C, Java, C++ or the like, and may comprise thousands or millions of lines of instructions. Thus, modifying the CBM module instruction file may be relatively complex, and require a relatively highly-skilled individual.

The CBM device 18 may also include one or more communication interfaces 28 that are configured to communicate with a remote device, such as a computer, via a network, and/or a flash drive device, such as a USB device. A storage device 31 may be used to store information, such as sensor data, the CBM module instruction file, or any other desired information.

Figure 2:
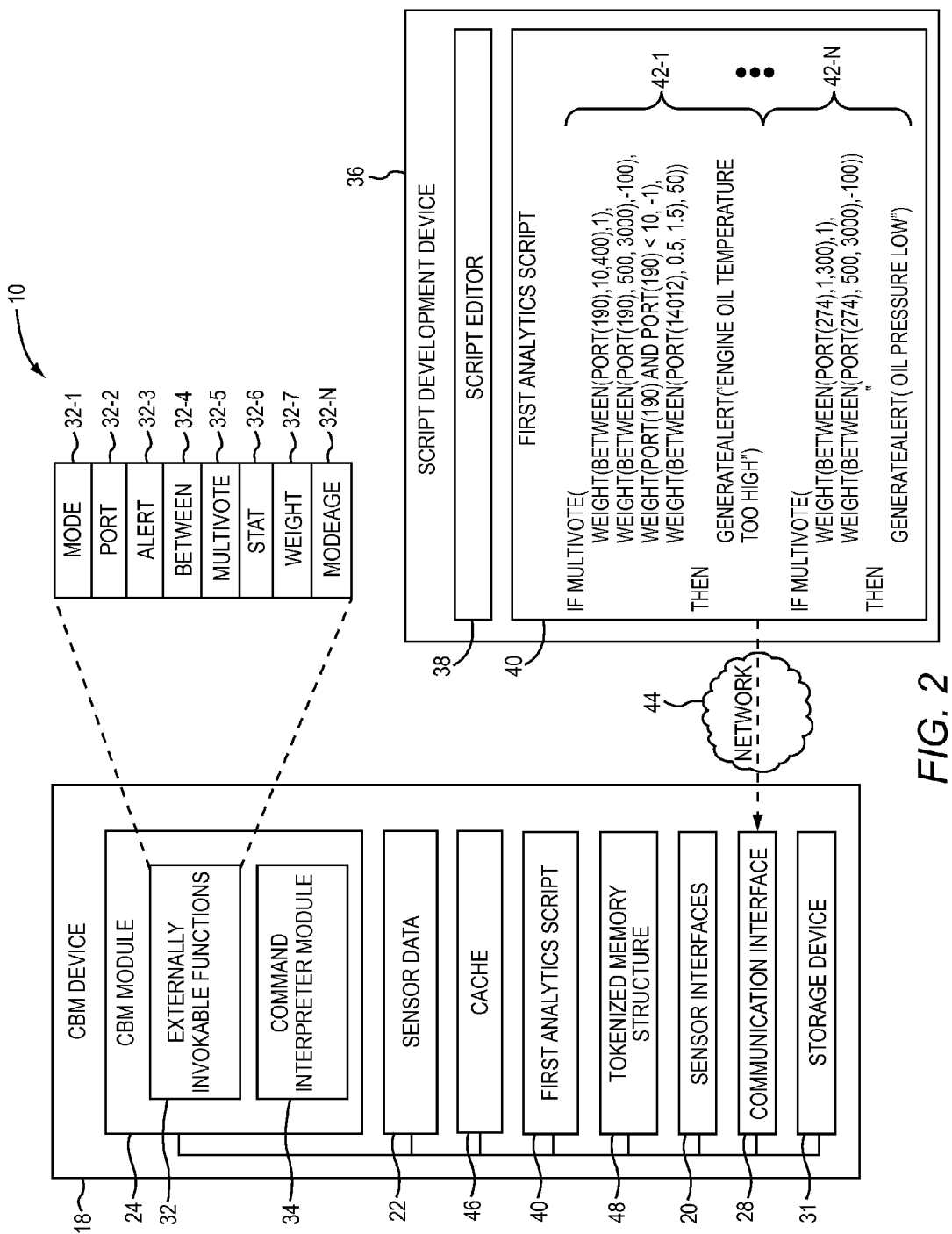
FIG. 2 is a block diagram of the environment illustrating a CBM device in greater detail according to one embodiment.

FIG. 2 is a block diagram of the environment 10 illustrating the CBM device 18 in greater detail according to one embodiment. Solely due to space constraints, the machine 12 is not illustrated. In some embodiments, the CBM module 24 includes one or more externally invokable functions 32-1-32-N (generally, externally invokable functions 32). In one embodiment, the CBM module 24 is written in a first computer programming language, such as C, C++, Java, or the like, which allows the generation of functions which may be invoked by external independent programs. While only eight externally invokable functions 32 are illustrated, the embodiments are not so limited, and the CBM module 24 can be written with any number of externally invokable functions 32. The externally invokable functions 32 are integral with the CBM module 24, and as such, can access and otherwise manipulate any data that is capable of being accessed and manipulated by the CBM module 24. The externally invokable functions 32 therefore provide a mechanism by which external and independent processes can be developed and, at run-time, can implement certain behavior of the CBM module 24. As will be discussed herein in greater detail, each externally invokable function 32 may be utilized in analytic commands for implementing CBM analytics in the CBM device 18. The externally invokable functions 32 can thus be utilized to extend an existing language, such as a scripting language, to generate a domain specific language that is unique to, and centered on, generating CBM analytics for use with the CBM device 18.

The CBM module 24 includes a command interpreter module 34 that is configured to interpret commands written in a second interpretable programming language at run-time. The command interpreter module 34 can comprise any interpreter for any suitable interpretable programming language. In one embodiment, the command interpreter module 34 comprises a Lua interpreter, available from LabLua, a laboratory of the Department of Computer Science of PUC-Rio, and the interpretable programming language comprises the Lua scripting language. The command interpreter module 34 is configured to receive an interpretable command and generate executable bytecodes based on the interpretable command. The executable bytecodes may then be executed to implement the interpretable command. The command interpreter module 34 can also be developed to interpret interpretable commands that utilize one or more of the externally invokable functions 32, and to generate executable bytecodes that invoke the externally invokable functions 32.

In one embodiment, a script development device 36 may include a script editor 38 to facilitate the generation of a first analytics script 40. The script development device 36 can comprise any suitable data processing device, such as, by way of non-limiting example, a desktop or laptop computer, a computing tablet, a smart phone, or the like. The script editor 38 may comprise any suitable editor, and, in one embodiment, may be provided in conjunction with a particular interpretable language, such as, by way of non-limiting example, the Lua scripting language. The first analytics script 40 contains a plurality of interpretable commands 42-1-42-N (generally, interpretable commands 42) which are interpretable by the command interpreter module 34, and which implement the CBM analytics for the CBM device 18. Generally, the CBM analytics evaluate real-time conditions of the machine 12 via the sensor data 22, and generate notifications for presentation to an operator based thereon. Such notifications may be merely informative, such as the current temperature of the engine oil, or may be in the form of an alert, such as notifying the operator that there is water in the engine air intake.

The interpretable commands 42 include English language words, such as "WEIGHT," "BETWEEN," "IF," and the like, and are thus easily understood by individuals who are familiar with the English language, even individuals that are not relatively skilled software developers. The interpretable commands 42 may thus be generated, and subsequently revised or updated by more readily available personnel than skilled software developers. This ability makes it relatively easy to change the CBM analytics of the CBM device 18 as desired.

Note also that certain of the English language words utilized in the interpretable commands 42 are the names of the externally invokable functions 32, such as "MULTIVOTE," "WEIGHT," "BETWEEN," and "PORT." The use of such words will cause, during processing of the first analytics script 40, the invocation of and execution of the corresponding externally invokable function 32. Thus, the embodiments allow the intuitive generation of customized functionality in the CBM device 18 in the form of the externally invokable functions 32, which may be accessed and leveraged using an easily understood, English-language—(or other natural language) based command structure. In essence, the embodiments allow an existing interpretable programming language, such as, in this example, the Lua scripting language, to be extended to include commands unique to the CBM device 18.

In this example, the externally invokable functions 32 provide the following functionality, but the embodiments are not limited to any particular externally invokable functions 32. The CBM module 24 may be designed to implement any number of externally invokable functions 32 implementing any desired functionality. The externally invokable function 32-1 ("MODE") returns a Boolean state of a component, subsystem, or other entity. The determination of a mode may include analyzing the sensor data 22 to determine a True or False value. The externally invokable function 32-2 ("PORT") allows access to a particular source of sensor data 22. For example, PORT(190) may allow access to sensor data 22 that indicates revolutions-per-minute of an engine, and PORT(100) may allow access to sensor data 22 that indicates an oil pressure.

The externally invokable function 32-3 ("ALERT") determines whether a particular alert state is active. The externally invokable function 32-4 ("BETWEEN") receives three arguments and determines if the first argument is between the second argument and the third argument. The externally invokable function 32-5 ("MULTIVOTE") accepts a variable number of arguments, and sums the arguments. If the sum is greater than zero, the externally invokable function 32-5 returns a value of true, and otherwise returns a value of false. The externally invokable function 32-6 ("STAT") generates a current statistic based on certain criteria, such as the sensor data 22. The externally invokable function 32-7 ("WEIGHT") receives two arguments, and returns the second argument if the first argument evaluates to a value of true. The externally invokable function 32-N ("MODEAGE") returns the amount of time a particular mode has been active. As discussed above, the externally invokable functions 32 illustrated herein are merely examples, and any desired externally invokable functions 32 may be generated and incorporated into the CBM module 24, for subsequent use as an interpretable command in the first analytics script 40.

After development of the first analytics script 40, the first analytics script 40 may be provided to the CBM device 18. The first analytics script 40 may be provided in any desired manner, such as via a wired or wireless network 44. Alternatively, the first analytics script 40 may be stored in a portable storage device such as a USB flash drive, which in turn may be coupled to a USB port of the CBM device 18. The CBM device 18 may then download the first analytics script 40 from the USB flash drive and store the first analytics script 40 in the storage device 31 for subsequent use by the CBM device 18 for implementing CBM analytics in the CBM device 18. Note that the interpretable commands 42 contained in the first analytics script 40 are in the form of English language words and are thus not directly executable by the CBM device 18. Rather, the interpretable commands 42 are only executable after being translated into a bytecode form by the command interpreter module 34.

The CBM device 18 may also include a cache 46, which may be used, for example, to store short term historical data associated with the CBM device 18, such as, by way of non-limiting example, sensor data 22 and modes associated with the components14. Among other things, the data stored in the cache 46 may be utilized to determine rates of changes of the sensor data 22.

As will be described in greater detail herein, in one embodiment, the CBM device 18 may directly, or via a token parser module (not illustrated), initially process the first analytics script 40 and generate a tokenized memory structure 48. The tokenized memory structure 48 may provide an efficient and condensed mechanism for access to the interpretable commands 42 during CBM processing by the CBM module 24.

Figure 3A:
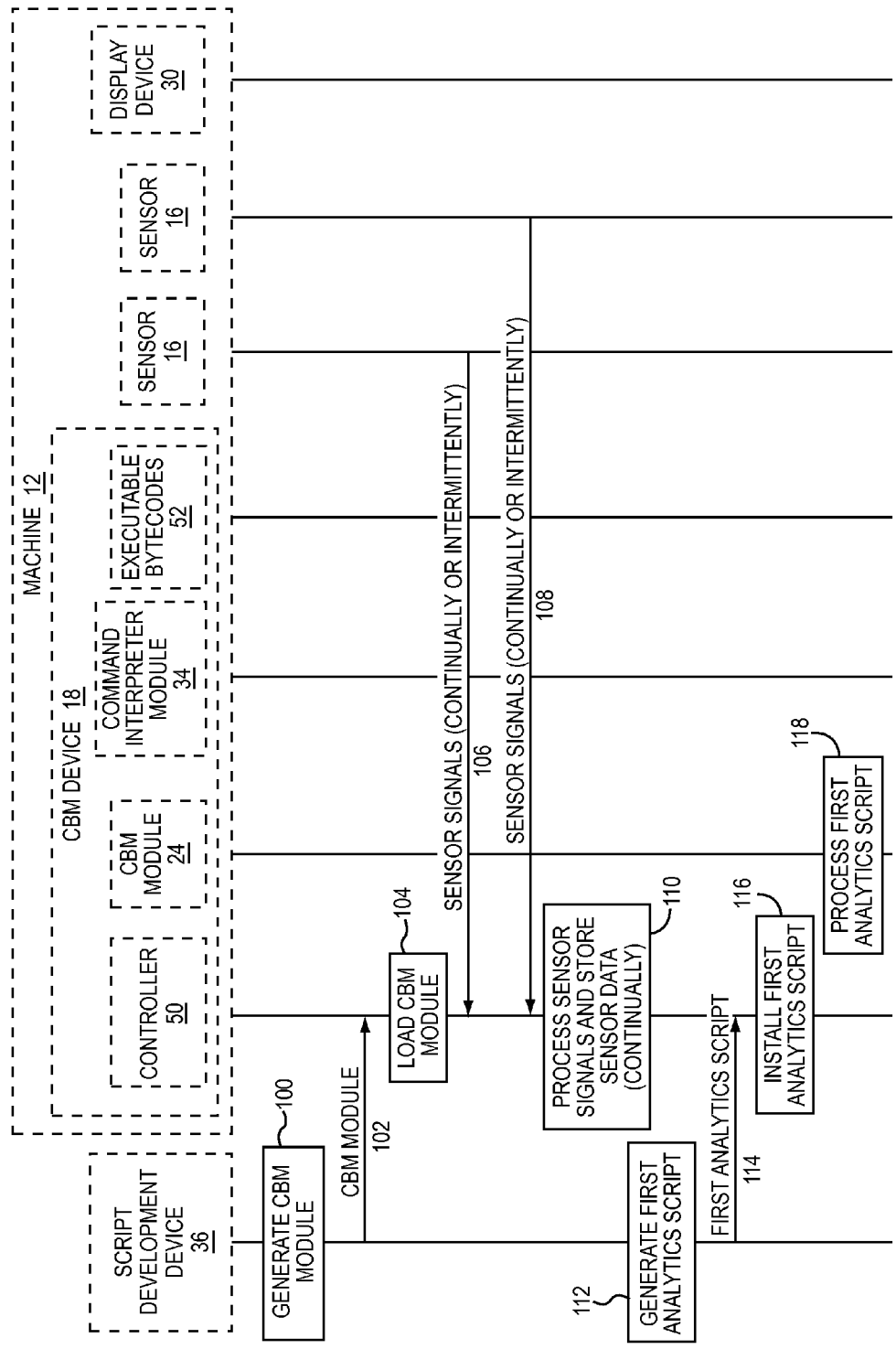
FIGS. 3A-3B are message flow diagrams illustrating an example message flow of the CBM device according to one embodiment.
Figure 3B:
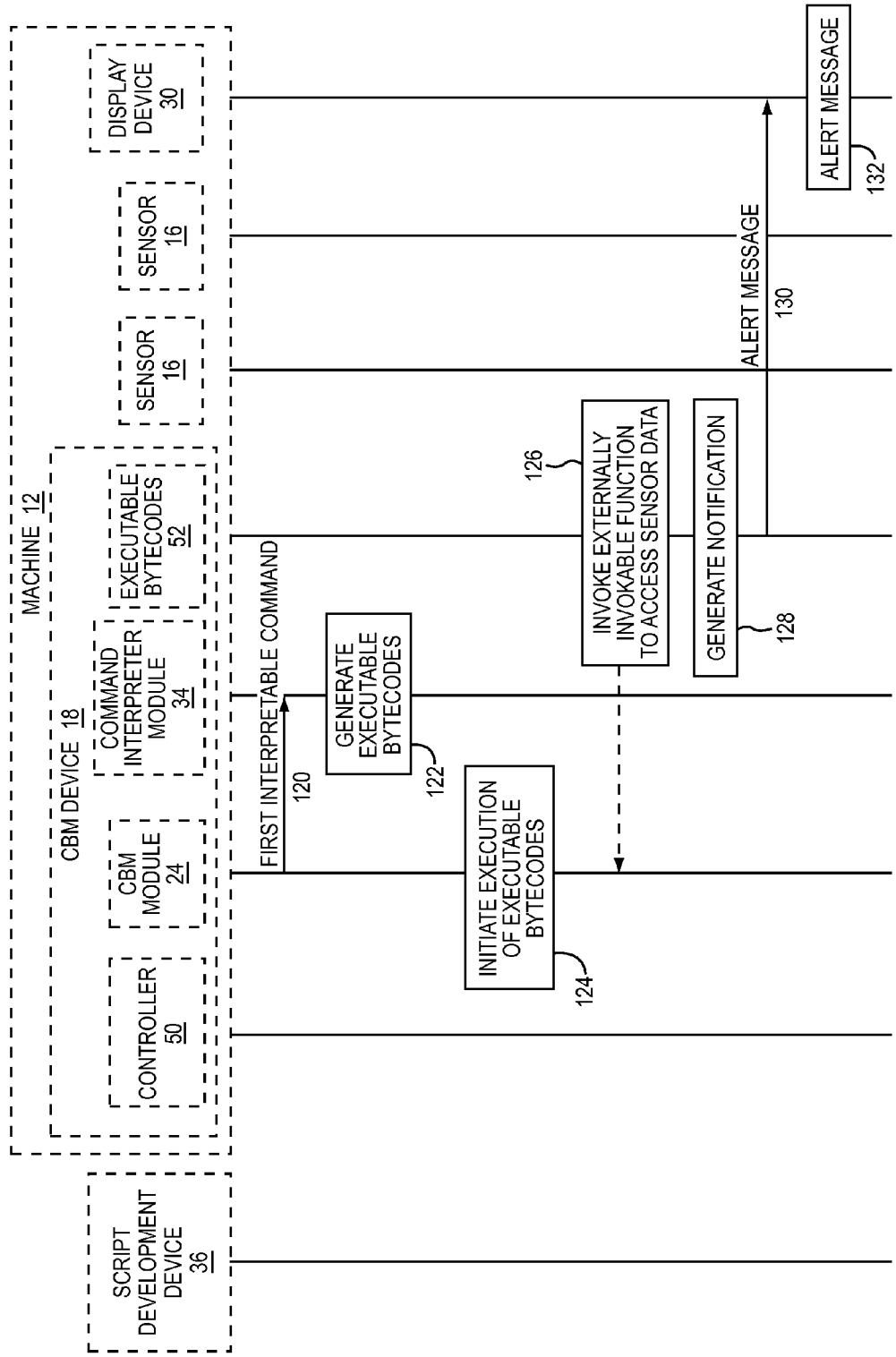

FIGS. 3A-3B are message flow diagrams illustrating an example message flow of the CBM device 18 according to one embodiment. Initially, an engineer designs and generates the CBM module 24 on the script development device 36 (block 100). As discussed above, the CBM module 24 may be developed in a first programming language having a first syntax, such as C, C++, Java, or the like. The engineer includes in the CBM module 24 any desired externally invokable functions 32. The engineer compiles first programming language instructions to generate an executable file and provides the executable file to the CBM device 18 (block 102). The CBM device 18 (via a controller 50 in this example) loads the CBM module 24 (block 104). This may include, for example, re-booting the CBM device 18 to remove a prior version of the CBM module 24 from a memory of the CBM device 18 and installing a new version of the CBM module 24. This may disrupt the operation of the CBM device 18 for a period of time.

The controller 50 may continually, or intermittently, receive sensor signals from the sensors 16 of the CBM device 18 (blocks 106-108). This may occur independently of and in parallel with processing performed by the CBM module 24. The controller 50 continually processes the sensor signals, as discussed above, to generate the sensor data 22 (block 110). At some point in time, an operator or other individual generates the first analytics script 40 on the script development device 36 (sometimes referred to herein as a remote device) (block 112). The first analytics script 40 is written in a second programming language having a second syntax that is different from the first programming language. The second programming language is preferably an English-word-based programming language that is easily understood by individuals that may not be skilled software developers. The first analytics script 40 comprises a plurality of interpretable commands 42 that implement the desired CBM analytics of the CBM device 18.

The first analytics script 40 is provided to the CBM device 18 (block 114). For example, the CBM device 18 may be temporarily or permanently communicatively coupled to the script development device 36 via the network 44. Alternatively, the first analytics script 40 may be provided to the CBM device 18 via a portable storage device, such as a USB flash drive device, for example. The CBM device 18 stores, or otherwise installs, the first analytics script 40 on the CBM device 18 (block 116). The CBM module 24 may then begin to process the first analytics script 40 (block 118). In some embodiments, in order to process the first analytics script 40, the CBM module 24 may first be terminated, and then reloaded. In other embodiments, the CBM module 24 may be designed such that a command may be utilized to instruct the CBM module 24 to discard a previous analytics script, and load a new analytics script.

The initial processing may involve tokenizing the first analytics script 40 to generate the tokenized memory structure 48. In addition to interpretable commands 42, the first analytics script 40 may include configuration statements or commands for use by the CBM module 24. In one embodiment, during an initial phase of processing, the CBM module 24 assigns, based on the first analytics script 40, each sensor 16 a corresponding port value. In one embodiment, the interpretable commands 42 are configured to access the sensor data 22 associated with a corresponding sensor 16 based on the corresponding port value.

Generally, the CBM module 24 operates in a continuous manner, and implements interpretable commands 42 in response to an event, such as the receipt of a sensor signal from a sensor 16. Upon such an event, the CBM module 24 accesses a particular one or more interpretable commands 42 that are to be processed upon the occurrence of such an event. The correlation between events and the one or more interpretable commands 42 may be defined in the first analytics script 40.

For purposes of illustration, assume that such an event occurs. The CBM module 24 accesses the tokenized memory structure 48 and identifies a first interpretable command 42 associated with the event. The CBM module 24 passes the first interpretable command 42 to the command interpreter module 34 (block 120). The command interpreter module 34 interprets the first interpretable command 42 and generates first command executable bytecodes 52 that are suitable for execution on the machine 12 (block 122). In one embodiment, the first command executable bytecodes 52 may comprise Java bytecodes that can be executed by a Java Virtual Machine. In other embodiments, the first command executable bytecodes 52 may comprise native bytecodes directly executable by the particular processing device of the CBM device 18. The command interpreter module 34 generates first command executable bytecodes 52 that are configured to invoke the one or more externally invokable functions 32 that are identified in the first interpretable command 42.

The CBM module 24 then initiates execution of the first command executable bytecodes 52 (block 124). The first command executable bytecodes 52 execute to implement the functionality of the corresponding interpretable command 42. For example, the first command executable bytecodes 52 may invoke an externally invokable function 32 to access the sensor data 22 and may generate a notification that quantifies the real-time condition of the component 14 from which the sensor data 22 originated (block 128). For example, the first command executable bytecodes 52, based on the sensor data 22, may determine that a characteristic of the component 14 is outside of a predetermined range. For example, the first command executable bytecodes 52 may determine that an engine oil temperature or an engine coolant temperature is outside of a desired range of temperatures. The first command executable bytecodes 52 may communicate the notification in the form of an alert message to the display device 30 that indicates that the characteristic of the component 14 is outside of the predetermined range (block 130). The display device 30 may present the alert message to the operator of the CBM device 18 (block 132).

Figure 4:
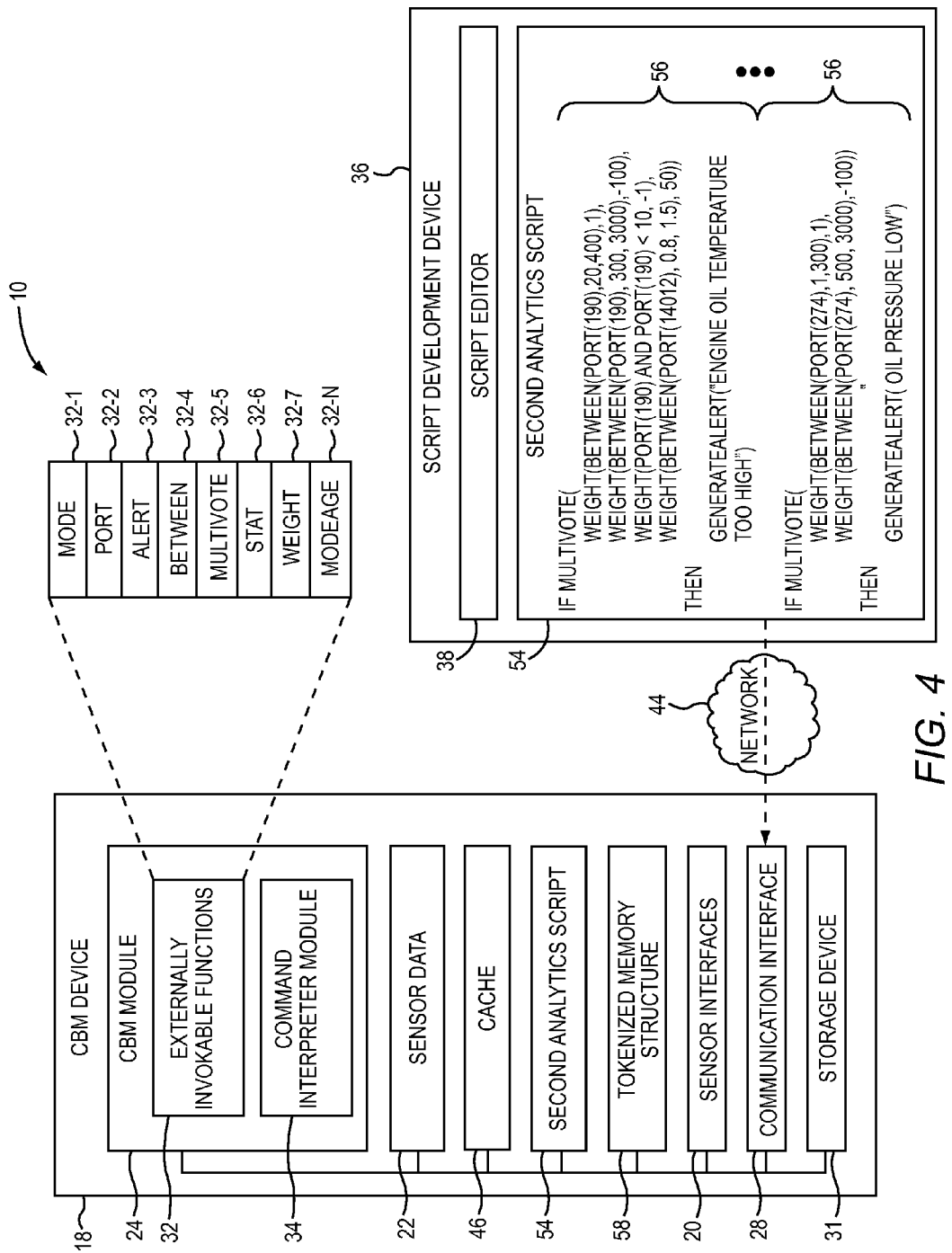
FIG. 4 is a block diagram of the environment at a point in time subsequent to that illustrated in FIG. 2 according to one embodiment.

FIG. 4 is a block diagram of the environment 10 at a point in time subsequent to that illustrated in FIG. 2 according to one embodiment. In this embodiment, assume that the first analytics script 40 included a first interpretable command that evaluated the characteristic of a component 14 to determine if the characteristic was outside of a first predetermined range. For purposes of illustration, assume that the first interpretable command 42 evaluated the temperature of the engine oil to determine if the temperature of the engine oil was between 200 and 220 degrees Fahrenheit. If not, the first interpretable command 42 would generate an alert for presentation on the display device 30.

Further assume that the machine 12, at a subsequent point in time, has been moved from a colder climate to an extremely warm climate, such as a desert, and that it has been determined that the engine oil temperature can safely rise to 240 degrees Fahrenheit. Due to the warmer ambient temperatures, the engine oil temperature is determined to be routinely rising above 220 degrees Fahrenheit, resulting in an alert being presented to the operator in accordance with the first interpretable command 42-1 (FIG. 2). An operator may then modify, on the script development device 36, via the script editor 38, the first analytics script 40 to generate a second analytics script 54 that comprises one or more second interpretable commands 56, including a second interpretable command 56 that alters the criteria from between 200-220 degrees Fahrenheit to between 200-240 degrees Fahrenheit. The second analytics script 54 can then be provided to the CBM device 18 to replace the first analytics script 40. The CBM device 18 processes and parses the second analytics script 54 to generate a tokenized memory structure 58, and thereafter no alerts will be generated unless the engine oil temperature rises above 240 degrees Fahrenheit. Note that the CBM analytics implemented via the second analytics script 54 were changed without any change to the CBM module 24. Thus, it was not necessary to modify the CBM module 24, recompile the CBM module 24, and install the CBM module 24 on the CBM device 18 to alter the CBM analytics implemented by the CBM module 24.

Figure 5:
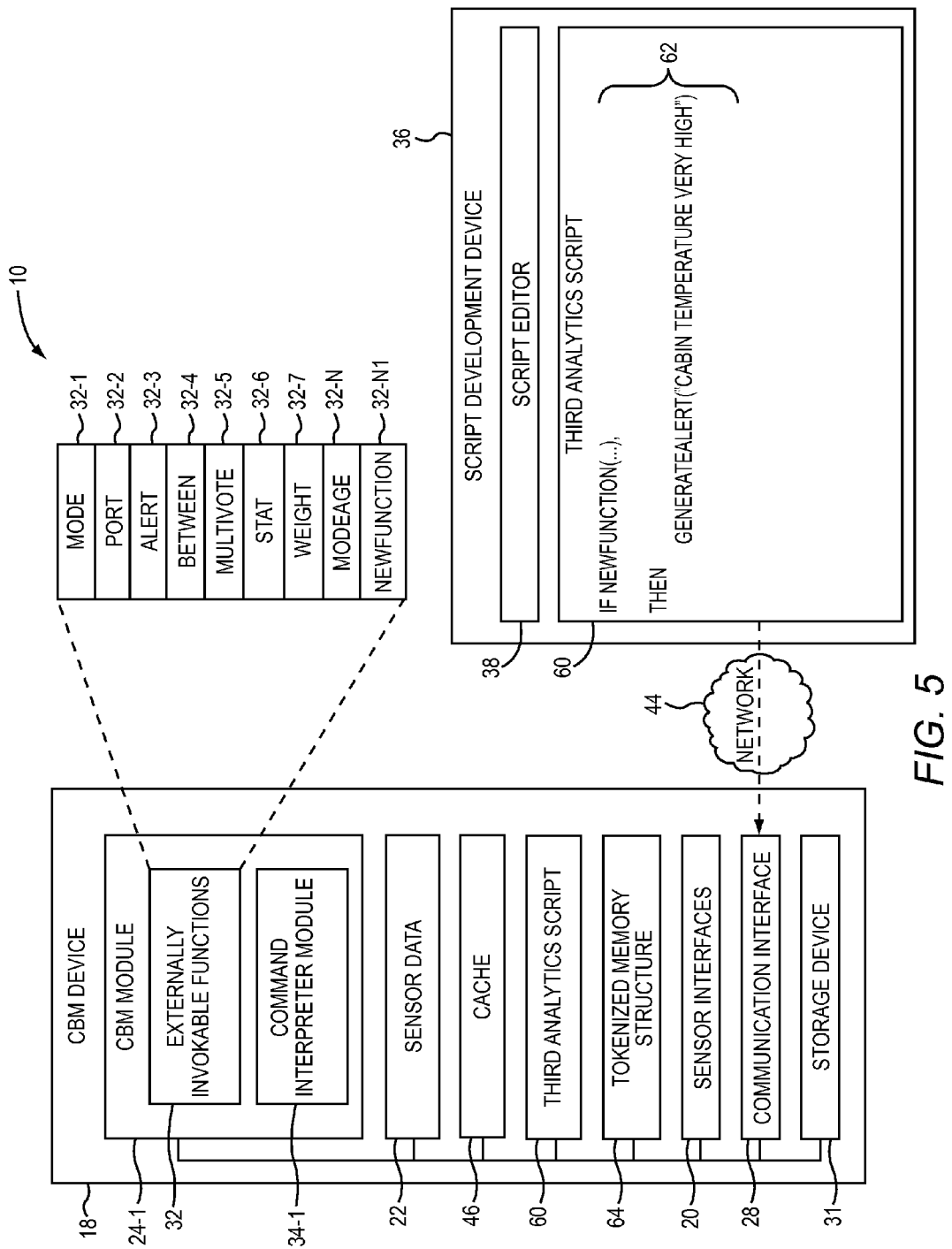
FIG. 5 is a block diagram of the environment at a point in time subsequent to that illustrated in FIG. 4, according to one embodiment.

FIG. 5 is a block diagram of the environment 10 at a point in time subsequent to that illustrated in FIG. 4 according to one embodiment. In this embodiment, assume that the manufacturer of the CBM module 24 desires to implement, or extend, the second programming language used to generate interpretable commands. In particular, the manufacturer desires to implement a command entitled "NEW-FUNCTION" which allows an interpretable command to have enhanced functionality. The manufacturer generates a new externally invokable function 32-N1 in a new CBM module 24-1. A new command interpreter module 34-1 is generated in order to enable the command interpreter module 34-1 to interpret the new interpretable command and in order generate suitable bytecodes for invoking the externally invokable function 32-N1. The CBM module 24-1 is then installed on the CBM device 18 to replace the CBM module 24. An individual may then develop a third analytics script 60 that includes a third interpretable command 62 that utilizes the new command "NEWFUNCTION". The third analytics script 60 may be provided to the CBM device 18 to replace a previous analytics script, such as the second analytics script 54. The CBM module 24-1 may initially parse, or have parsed, the third analytics script 60 to generate a new tokenized memory structure 64. Upon the occurrence of the corresponding event, the CBM module 24-1 may access the third interpretable command 62 and pass the third interpretable command 62 to the command interpreter module 34-1 for interpretation and the generation of suitable executable bytecodes. The command interpreter module 34-1 generates executable bytecodes, which, when executed, invoke the externally invokable function 32-N1.

Figure 6:
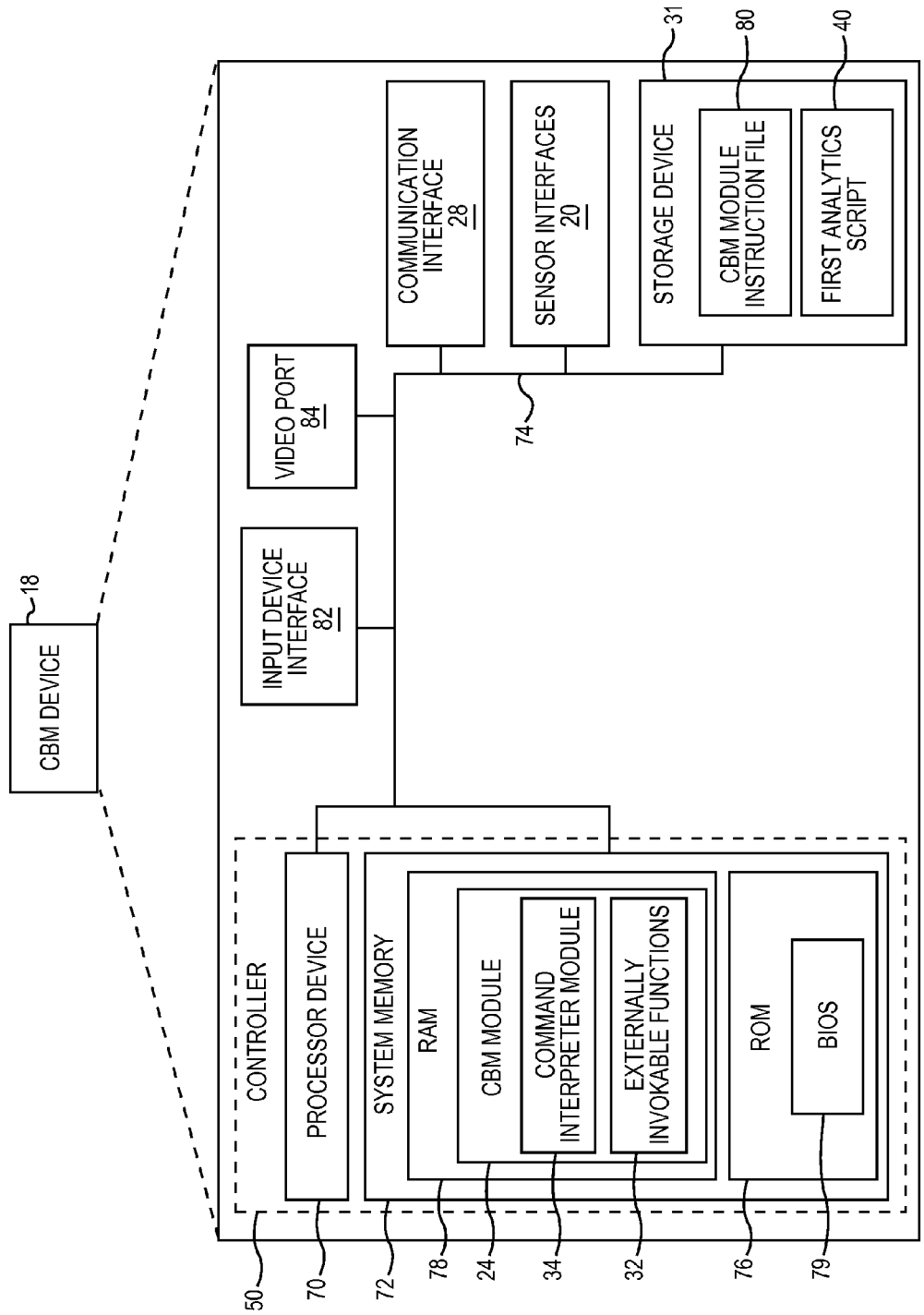
FIG. 6 is a block diagram of the CBM device according to one embodiment.

FIG. 6 is a block diagram of the CBM device 18 according to one embodiment. The CBM device 18 may comprise any computing or processing device capable of including firmware, hardware, and/or executing software instructions to implement the functionality described herein, such as a printed circuit board, laptop or desktop computer, computing table, or the like. The CBM device 18 includes a processor device 70, a system memory 72, and a system bus 74. The system bus 74 provides an interface for system components including, but not limited to, the system memory 72 and the processor device 70. The processor device 70 can be any commercially available or proprietary processor.

The system bus 74 may be any of several types of bus structures that may further interconnect to a memory bus (with or without a memory controller), a peripheral bus, and/or a local bus using any of a variety of commercially available bus architectures. The system memory 72 may include non-volatile memory 76 (e.g., read only memory (ROM), erasable programmable read only memory (EPROM), electrically erasable programmable read only memory (EEPROM), etc.) and/or volatile memory 78 (e.g., random access memory (RAM)). A basic input/output system 79 (BIOS) may be stored in the non-volatile memory 76, and can include the basic routines that help to transfer information between elements within the CBM device 18. The volatile memory 78 may also include a high-speed RAM, such as static RAM for caching data.

The CBM device 18 may further include or be coupled to the storage device 31, which may comprise, for example, an internal or external hard disk drive (HDD) (e.g., enhanced integrated drive electronics (EIDE) or serial advanced technology attachment (SATA)), HDD (e.g., EIDE or SATA) for storage, flash memory, or the like. The storage device 31 and other drives, associated with computer-readable media and computer-usable media, may provide non-volatile storage of data, data structures, computer-executable instructions, and the like. Although the description of computer-readable media above refers to an HDD, it should be appreciated by those skilled in the art that other types of media which are readable by a computer, such as Zip disks, magnetic cassettes, flash memory cards, cartridges, and the like, may also be used in the exemplary operating environment, and further, that any such media may contain computer-executable instructions for performing novel methods of the disclosed architecture. The storage device 31 may store a CBM module instruction file 80 which, in one embodiment, contains the executable instructions that implement the CBM module 24. The storage device 31 may also store the first analytics script 40.

A number of modules can be loaded into the volatile memory 78, including the CBM module 24, the command interpreter module 34, and the externally invokable functions 32. An operating system (not illustrated) and the CBM module 24, the command interpreter module 34, and the externally invokable functions 32 may implement the functionality described herein in whole or in part. It is to be appreciated that the embodiments can be implemented with various commercially available operating systems or proprietary operating systems.

All or a portion of the embodiments may be implemented as a computer program product stored on a transitory or non-transitory computer-usable or computer-readable storage medium, such as the storage device 31, which includes complex programming instructions, such as complex computer-readable program code, configured to cause the processor device 70 to carry out the steps described herein. Thus, the computer-readable program code can comprise software instructions for implementing the functionality of the embodiments described herein when executed on the processor device 70. The processor device 70, in conjunction with the CBM module 24, the command interpreter module 34, and the externally invokable functions 32 in the volatile memory 78, may serve as the controller 50 for the CBM device 18 that is configured to, or adapted to, implement the functionality described herein.

An operator may also be able to enter commands to the CBM device 18 through a keyboard (not illustrated), a pointing device such as a mouse (not illustrated), or a touch-sensitive surface (not illustrated). Such input devices may be connected to the processor device 70 through an input device interface 82 that is coupled to the system bus 74, but can be connected by other interfaces such as a parallel port, an Institute of Electrical and Electronic Engineers (IEEE) 1394 serial port, a Universal Serial Bus (USB) port, an IR interface, and the like.

The CBM device 18 may also include the communication interface 28, suitable for communicating with the network 44 and other networks as appropriate or desired. The CBM device 18 may also include a video port 84 configured to interface with the display device 30, to provide the operator with notifications as appropriate.

Those skilled in the art will recognize improvements and modifications to the preferred embodiments of the disclosure. All such improvements and modifications are considered within the scope of the concepts disclosed herein and the claims that follow.

What is claimed is:

1. A method for implementing condition-based maintenance (CBM) on a machine having a plurality of components, comprising:
   receiving, by a CBM device comprising a processor, a plurality of sensor signals generated by a plurality of corresponding sensors, the plurality of sensor signals indicating real-time conditions of corresponding components of the plurality of components;
   processing the plurality of sensor signals to generate sensor data that quantifies the real-time conditions of the corresponding components;
   loading, by the CBM device, a CBM module generated at a first time and implementing a plurality of externally invokable functions;

receiving, by the CBM device, a first analytics script generated at a second time, the first analytics script comprising a plurality of first interpretable commands, some of the plurality of first interpretable commands configured to invoke some of the plurality of externally invokable functions;

invoking, by the CBM module, a command interpreter module to interpret at least one first interpretable command and generate first command executable bytecodes; and executing the first command executable bytecodes to generate a notification identifying a real-time condition of a first component for presentation on a display device.

2. The method of claim 1, further comprising:

detecting, by the CBM module, the at least one first interpretable command in the first analytics script, the at least one first interpretable command configured to invoke a first externally invokable function of the plurality of externally invokable functions; and wherein invoking the command interpreter module to interpret the at least one first interpretable command and generate the first command executable bytecodes further comprises:

passing, by the CBM module, the at least one first interpretable command to the command interpreter module; and generating, by the command interpreter module based on the at least one first interpretable command, the first command executable bytecodes that invoke the first externally invokable function; and wherein executing the first command executable bytecodes to generate the notification identifying the real-time condition of the first component for presentation on the display device further comprises:

invoking, by the first command executable bytecodes, the first externally invokable function to access the sensor data that quantifies the real-time condition of the first component; and generating the notification identifying the real-time condition of the first component for presentation on the display device.

3. The method of claim 1, wherein processing the sensor signals to generate the sensor data that quantifies the real-time conditions of the corresponding components comprises filtering the sensor signals and extracting features from the sensor signals to generate the sensor data.

4. The method of claim 1, wherein the CBM module is written in a first programming language having a first syntax, and the plurality of first interpretable commands is written in a second interpretable programming language having a second syntax that is different from the first syntax.

5. The method of claim 4, wherein the plurality of first interpretable commands comprises English language words.

6. The method of claim 1, further comprising:

determining, by the first command executable bytecodes, based on the sensor data, that a characteristic of the first component is outside of a first predetermined range; and generating, by the first command executable bytecodes, an alert for presentation on the display device that indicates that the characteristic of the first component is outside of the first predetermined range.

7. The method of claim 6, further comprising:

receiving a second analytics script generated at a third time that is later than the second time, the second analytics script replacing the first analytics script, the second analytics script comprising a plurality of second interpretable commands, some of the plurality of second interpretable commands configured to invoke some of the plurality of externally invokable functions;

invoking, by the CBM module, the command interpreter module to interpret at least one second interpretable command and generate second command executable bytecodes;

executing the second command executable bytecodes;

determining, by the second command executable bytecodes, based on the sensor data, that the characteristic of the first component is outside of a second predetermined range that is different from the first predetermined range; and generating, by the second command executable bytecodes, an alert for presentation on the display device that indicates that the characteristic of the first component is outside of the second predetermined range.

8. The method of claim 7, wherein the characteristic of the first component comprises one of an engine oil temperature and an engine coolant temperature.

9. The method of claim 1, further comprising:

processing, by the CBM module, the first analytics script; and assigning, by the CBM module based on the first analytics script, each sensor of the plurality of sensors a corresponding port value, and wherein the plurality of first interpretable commands is configured to access the sensor data associated with a corresponding sensor based on the corresponding port value.

10. The method of claim 1, wherein receiving the first analytics script generated at the second time comprises:

interfacing with a remote device; and receiving the first analytics script generated at the second time from the remote device.

11. A condition-based maintenance (CBM) device for implementing CBM on a machine having a plurality of components, comprising:

a sensor interface configured to be coupled to a plurality of sensors;

a communication interface configured to communicate with a remote device;

a controller comprising a processor coupled to the sensor interface and the communication interface, and configured to:

receive sensor signals generated by corresponding sensors of the plurality of sensors, the sensor signals indicating real-time conditions of corresponding components of the plurality of components;

process the plurality of sensor signals to generate sensor data that quantifies the real-time conditions of the corresponding components;

load a CBM module generated at a first time and implementing a plurality of externally invokable functions;

receive a first analytics script generated at a second time, the first analytics script comprising a plurality of first interpretable commands, some of the plurality of first interpretable commands configured to invoke some of the plurality of externally invokable functions;

invoke, via the CBM module, a command interpreter module to interpret at least one first interpretable command and generate first command executable bytecodes; and execute the first command executable bytecodes to generate a notification identifying a real-time condition of a first component for presentation on a display device.

12. The CBM device of claim 11, wherein the controller is further configured to:
   detect, via the CBM module, the at least one first interpretable command in the first analytics script, the at least one first interpretable command configured to invoke a first externally invokable function of the plurality of externally invokable functions; and
   wherein to invoke the command interpreter module to interpret the at least one first interpretable command and generate the first command executable bytecodes, the controller is further configured to:
      pass, via the CBM module, the at least one first interpretable command to the command interpreter module; and
      generate, via the command interpreter module based on the at least one first interpretable command, first command executable bytecodes that invoke the first externally invokable function; and
   wherein to execute the first command executable bytecodes to generate the notification identifying the real-time condition of the first component for presentation on the display device, the controller is further configured to:
      invoke, via the first command executable bytecodes, the first externally invokable function to access the sensor data that quantifies the real-time condition of the first component; and
      generate the notification identifying the real-time condition of the first component for presentation on the display device.

13. The CBM device of claim 11, wherein to process the sensor signals to generate the sensor data that quantifies the real-time conditions of the corresponding components, the controller is further configured to filter the sensor signals and extract features from the sensor signals to generate the sensor data.

14. The CBM device of claim 11, wherein the CBM module is written in a first programming language having a first syntax, and the plurality of first interpretable commands is written in a second interpretable programming language having a second syntax that is different from the first syntax.

15. The CBM device of claim 14, wherein the plurality of first interpretable commands comprises English language words.

16. The CBM device of claim 11, wherein the controller is further configured to:
   determine, via the first command executable bytecodes, based on the sensor data, that a characteristic of the first component is outside of a first predetermined range; and
   generate, via the first command executable bytecodes, an alert for presentation on the display device that indicates that the characteristic of the first component is outside of the first predetermined range.

17. The CBM device of claim 16, wherein the controller is further configured to:
   receive a second analytics script generated at a third time that is later than the second time, the second analytics script replacing the first analytics script, the second analytics script comprising a plurality of second interpretable commands, some of the plurality of second interpretable commands configured to invoke some of the plurality of externally invokable functions;
   invoke, via the CBM module, the command interpreter module to interpret at least one second interpretable command and generate second command executable bytecodes;
   execute the second command executable bytecodes;
   determine, via the second command executable bytecodes, based on the sensor data, that the characteristic of the first component is outside of a second predetermined range that is different from the first predetermined range; and
   generate, via the second command executable bytecodes, an alert for presentation on the display device that indicates that the characteristic of the first component is outside of the second predetermined range.

18. The CBM device of claim 17, wherein the characteristic of the first component comprises one of an engine oil temperature and an engine coolant temperature.

19. A method for implementing condition-based maintenance (CBM) on a machine, comprising:
   receiving, by a CBM device comprising a processor, a plurality of sensor signals from a plurality of corresponding sensors, the plurality of sensor signals being indicative of real-time conditions of corresponding components;
   accessing, by a CBM module implementing a plurality of externally invokable functions, a first analytics script generated at a point in time, the first analytics script comprising a plurality of first interpretable commands, some of the plurality of first interpretable commands invoking some of the plurality of externally invokable functions; and
   in response to a first real-time condition of a respective corresponding component, causing, by the CBM module, execution of a respective first interpretable command to generate an alert for presentation on a display device that indicates that a characteristic of the respective corresponding component is outside of a first predetermined range.

* * * * *